US007023909B1

(12) United States Patent
Adams et al.

(10) Patent No.: US 7,023,909 B1
(45) Date of Patent: Apr. 4, 2006

(54) SYSTEMS AND METHODS FOR A WIRELESS MODEM ASSEMBLY

(75) Inventors: John A. Adams, Escondido, CA (US); Ronald R Reeves, Ramona, CA (US)

(73) Assignee: Novatel Wireless, Inc., San Diego, CA (US)

( * ) Notice: Subject to any disclaimer, the term of this patent is extended or adjusted under 35 U.S.C. 154(b) by 732 days.

(21) Appl. No.: 09/790,428

(22) Filed: Feb. 21, 2001

(51) Int. Cl.
*H04B 1/38* (2006.01)
*H04L 5/16* (2006.01)

(52) U.S. Cl. ...................... 375/222; 375/259; 343/865; 343/907; 343/913

(58) Field of Classification Search ............ 343/700 R, 343/740, 702, 781 R, 781 P, 782, 821, 859, 343/860, 865, 906, 907; 375/222, 219, 260, 375/259
See application file for complete search history.

(56) References Cited

U.S. PATENT DOCUMENTS

| | | | | |
|---|---|---|---|---|
| 3,845,490 A | 10/1974 | Manwarren et al. | 343/821 |
| 4,512,024 A * | 4/1985 | Gutleber | 375/254 |
| 4,825,220 A | 4/1989 | Edward et al. | 343/795 |
| 4,928,072 A * | 5/1990 | Scott | 330/149 |
| 5,867,131 A * | 2/1999 | Camp et al. | 343/797 |
| 5,892,486 A | 4/1999 | Cook et al. | 343/795 |
| 5,936,587 A | 8/1999 | Gudilev et al. | 343/752 |
| 5,945,954 A | 8/1999 | Johnson | 343/702 |
| 5,949,379 A | 9/1999 | Yang | 343/702 |
| 5,999,140 A | 12/1999 | Johnson | 343/795 |
| 6,025,811 A | 2/2000 | Canora et al. | 343/793 |
| 6,133,886 A | 10/2000 | Fariello et al. | 343/702 |
| 6,147,653 A | 11/2000 | Wallace et al. | 343/702 |
| 6,181,284 B1 * | 1/2001 | Madsen et al. | 343/702 |
| 6,341,217 B1 * | 1/2002 | Wong | 455/575.5 |
| 6,456,245 B1 * | 9/2002 | Crawford | 343/702 |
| 6,538,606 B1 * | 3/2003 | Quinn et al. | 343/702 |
| 6,725,057 B1 * | 4/2004 | Boyle | 455/277.1 |
| 2002/0101377 A1 * | 8/2002 | Crawford | 343/702 |
| 2003/0025612 A1 * | 2/2003 | Holmes et al. | 340/870.02 |

FOREIGN PATENT DOCUMENTS

| | | |
|---|---|---|
| WO | WO99/13528 | 9/1998 |
| WO | WO00/52783 | 2/2000 |

* cited by examiner

*Primary Examiner*—Jean B. Corrielus
(74) *Attorney, Agent, or Firm*—Foley & Lardner, LLP

(57) ABSTRACT

A RF wireless modem with an integral antenna. The antenna is a compact, horizontally-polarized, balanced, multi-element, directional antenna with integral balun, constructed on one end of a printed wire board (PWB) and radiating preferably away from the modem circuitry on the remaining portions of PWB. The antenna includes a matching network for matching an impedance of the antenna with an impedance of an unbalanced connection and a balun for transforming a RF transmit signal received from the unbalanced connection into a balanced RF transmit signal. The antenna also includes a radiator for transmitting the balanced RF transmit signal and a reflector for reflecting at least some of the energy of the transmitted signal away from the modem circuitry. The antenna can also include a director for directing the RF transmit signal in a desired direction.

30 Claims, 9 Drawing Sheets

Figure 1:
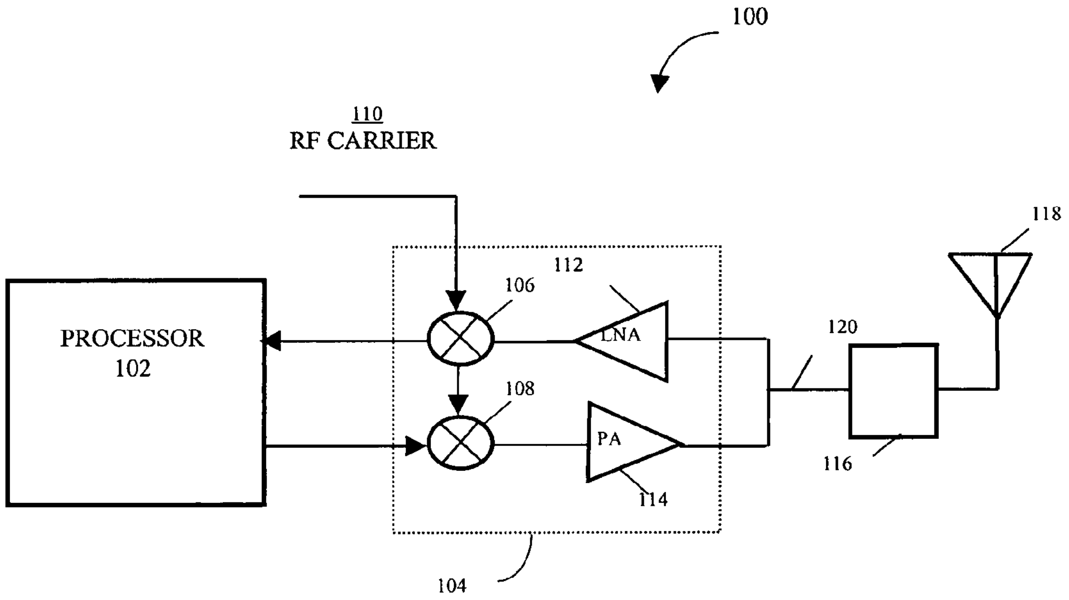

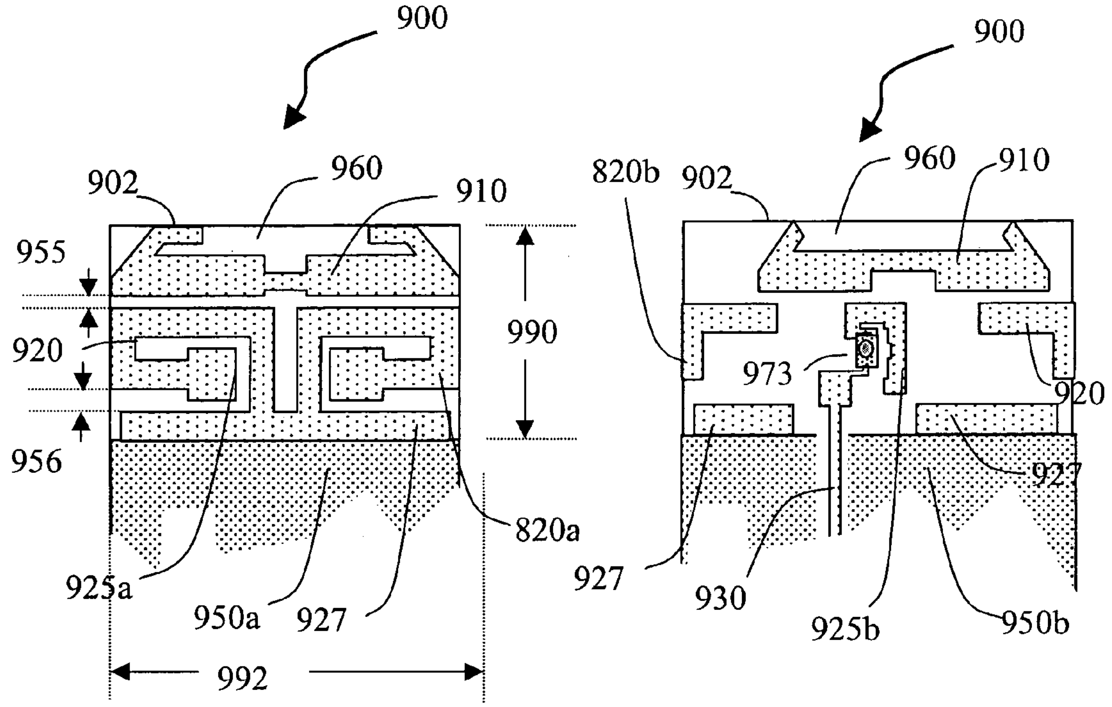
*Fig.9a* *Fig.9b*

SYSTEMS AND METHODS FOR A WIRELESS MODEM ASSEMBLY

BACKGROUND OF THE INVENTION

1. Field of the Invention

The present invention relates to RF wireless modems for use in a laptop, Portable Digital Assistant (PDA), or similar device and more particularly, to RF wireless modems with integral, compact, horizontally-polarized, balanced, multi-element, directional antenna with integral balun.

2. Background

Recent advancements in electronics have improved the performance of RF wireless modems. For example, advancements in integrated circuit technology have led to high performance radio frequency (RF) circuits. The RF circuits are used to construct transmitters, receivers, and other signal processing components typically found in RF wireless modems. Also, advancements in integrated circuit technology have led to a reduction in the size of RF circuits, thereby leading to a reduction in the overall size of RF wireless modems. Similarly, advancements in battery technology have resulted in smaller, lighter, and longer lasting batteries used in RF wireless modems. These advancements have resulted in smaller and lighter RF wireless modems that operate for a longer period of time on a single charge.

A user of a RF wireless modem must be able to communicate with a wireless communication system's base station, which can be located in any direction from the user and radiates and receives RF signals that are generally vertically polarized. Historically, this has led to the use of vertically polarized antennas for RF wireless modems and other devices, such as cellular phones, that must communicate with wireless communication system base stations. Engineers have designed vertically polarized antennas ranging from simple quarter-wave vertical whips or monopoles, to vertical dipoles, to ¾ wave and ⅝ wave vertical antennas. Some examples of smaller vertical polarized antennas are the "pillbox" antenna, the inverted F antenna, the vertical polarized current loop antenna, and the vertically polarized patch antenna. Some engineers have also used balanced dipole antennas typically of ½ wavelength long.

Portable wireless communication devices such as pagers and cellular phones are used extensively today. For example, one such device is the conventional wireless messaging device, which now gives the user full text capability and makes return phone calls less necessary by providing access to information on anything from meetings for the day to local movie listings to the latest global news update. More elaborate, wireless messaging devices combine the benefits and flexibility of two-way messaging, the ability to run software applications, and personal computer connectivity with the wear-ability and convenience of a conventional wireless messaging device.

Electronic computing devices are also extensively used today. These computing devices can be fixed, such as a desk top computer, or portable. Portable computing devices in particular are becoming more and more popular. The portability of new electronic organizers PDAs, for example, combined with their longer battery life, larger memories, and safe storage of information, has caused a growth in popularity of these devices over the past few years. New functions such as the synchronization with a personal information manager has proven a major benefit for users of portable computing devices in both their personal and business lives.

Manufacturers of RF wireless modems, manufacturers of electronic computing devices, and wireless communication service providers are teaming up to produce integrated services and products including wireless applications capable of receiving text, numeric, or binary messages, and sometimes allowing clipped and full internet access, via RF wireless modems. These enterprise and consumer applications give electronic computing users the capability to receive wireless e-mail, up-to-the-minute news and stock reports, remote updates on interest rates and financial information, weather warnings, and many other applications yet to be imagined. For example, including a RF wireless modem in a computing device enables web-browsing over wireless network access provided by such current and future carrier technologies such as CDPD, CDMA, GSM, GPRS, UMTS, W-CDMA, Richocet, and other proprietary network technology using either circuit switched or packet switched technology.

The combination of portable and semi-portable computing devices and rf wireless modems presents new challenges to the RF engineer. For example, there are several problems that result from the integration of a RF wireless modem into an electronic computing device, such as limited antenna space for the RF wireless modem, the degradation of performance of the RF wireless modem due to electromagnetic interference (EMI) from the electronic computing device, the degradation of the performance of the electronic computing device due to transmitted RF energy from the RF wireless modems, and the degradation of the RF wireless modem receiving circuitry due to the transmitted RF energy from the RF wireless modem in full duplex systems.

EMI can affect an electronic system through conduction, radiation, or a combination of both. EMI control is a difficult design aspect for RF wireless modem integration into the electronic computing device, since there are so many combinations of EMI sources in the electronic computing device. Additionally, the very high sensitivity of the RF wireless modem's receiver and the close proximity of its antenna to the circuitry of the electronic computing device make it very susceptible to EMI. This high noise environment creates receiver desensitization when undesired EMI signals occur at the same frequency as the receive frequency, or at a number of other frequencies sensitive to the receiver circuitry (such as the intermediate frequency). Since the receiver cannot differentiate between the desired and undesired signals, the undesired EMI signal can block out the desired signals to desensitize or lower the sensitivity threshold of the receiver. If the amplitude level of the undesired signal can be lowered enough using EMI control techniques, the receiver's sensitivity threshold is not degraded or degraded an allowable amount.

One way to control EMI is to re-design the electronic computing device with EMI in mind. For example, making the housing of the electronic computing device a shielded box, using a dedicated circuit board layer as the ground-plane, using a ground-plane area underneath the RF wireless modem, or modifying the electronic circuit design to reduce the EMI emissions from the electronic computing device are all advantages approaches to controlling EMI. Since the electronic computing device is usually already in existence, however, and most manufacturers do not want to make changes to their electronic computing device, these type of major design modifications are not desirable. Therefore, the RF wireless modem must be designed to reduced susceptibility to the EMI emissions of the electronic computing device. Further, the RF wireless modem should not cause interference with the computing device, and it should fit within the space limitations of the electronic computing device.

SUMMARY OF THE INVENTION

The present invention is an RF wireless modem with an integral antenna. Antenna is a compact, horizontally-polarized, balanced, multi-element, directional antenna with integral balun, constructed on one end of a printed wire board (PWB) and radiating preferably away from the modem circuitry on the remaining portions of PWB.

In one embodiment, the antenna is a horizontally polarized antenna that includes a matching network for matching an impedance of the antenna with an impedance of an unbalanced connection and a balun for transforming a RF transmit signal received from the unbalanced connection into a balanced RF transmit signal. The antenna also includes a radiator for transmitting the balanced RF transmit signal and a reflector for reflecting at least some of the energy of the transmitted signal away from the modem circuitry.

In one aspect of the invention, the maximum area of the antenna is approximately 76.2 mm by 35 mm, and the minimum area of the antenna is approximately 10 mm by 4 mm.

In another aspect of the invention, the area of the antenna is approximately 50 mm by 27 mm.

This compact spacing allows such an antenna to be included in a wireless modem assembly. As such, in another aspect of the invention the antenna is included in a wireless modem assembly that also includes a processor for encoding a baseband transmit signal and receiving a baseband receive signal and a transceiver for modulating the baseband transmit signal with a RF carrier signal to produce a RF transmit signal and for demodulating a RF receive signal with a RF carrier signal to produce the baseband receive signal.

Further features and advantages of this invention as well as the structure of operation of various embodiments are described in detail below with reference to the accompanying drawings.

BRIEF DESCRIPTIONS OF THE DRAWINGS

Figure 2A:
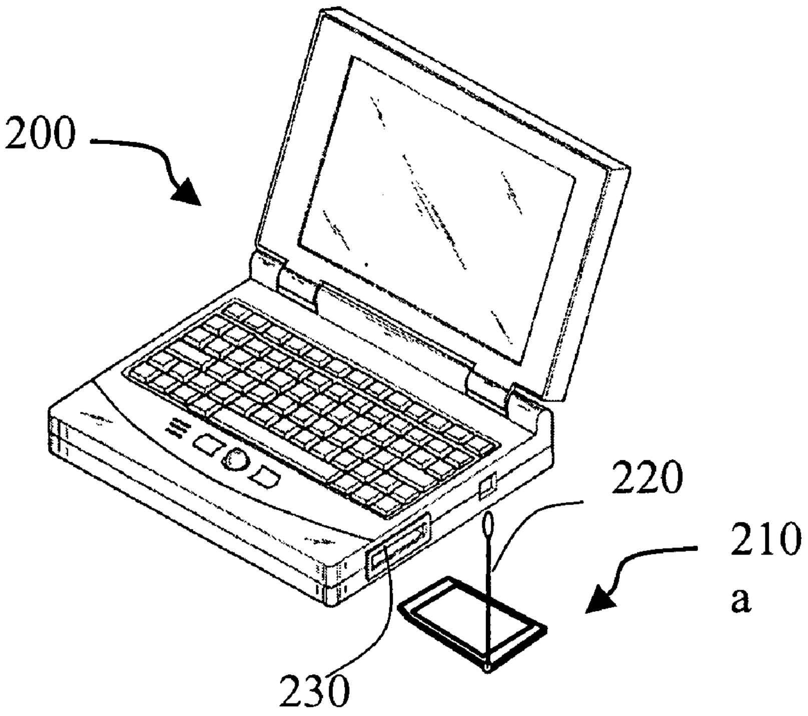
Figure 2B:
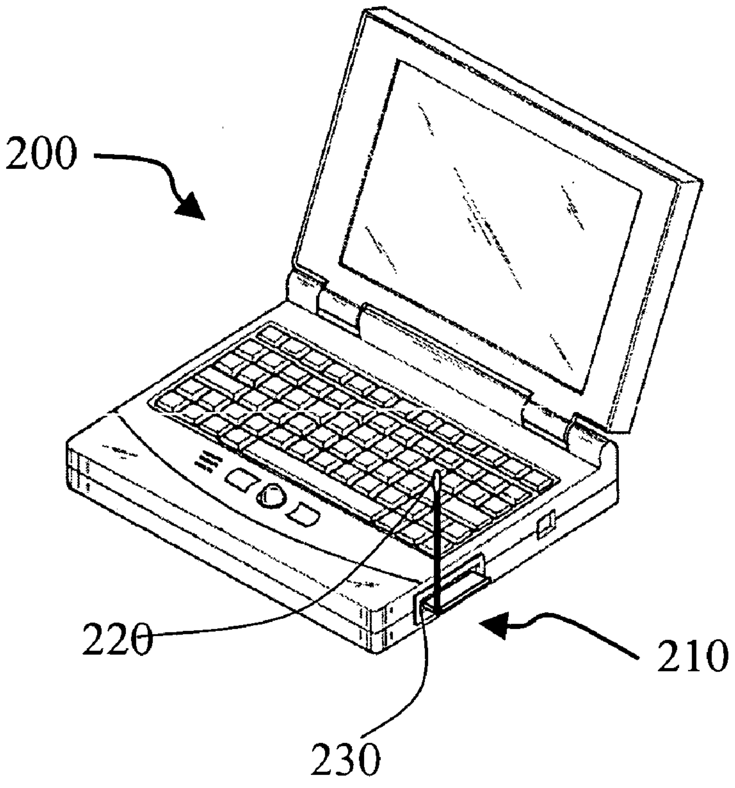
Figure 3A:
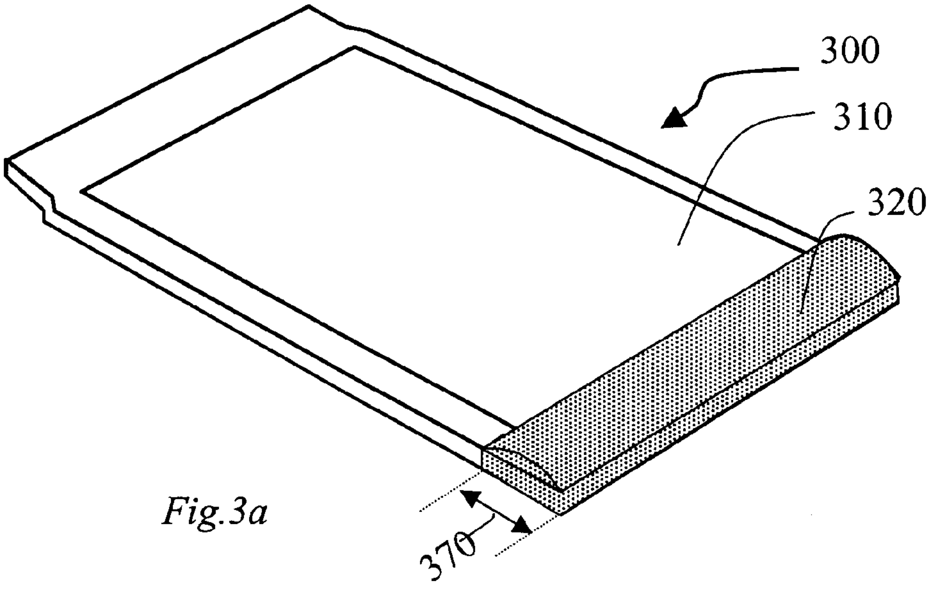
Figure 3B:
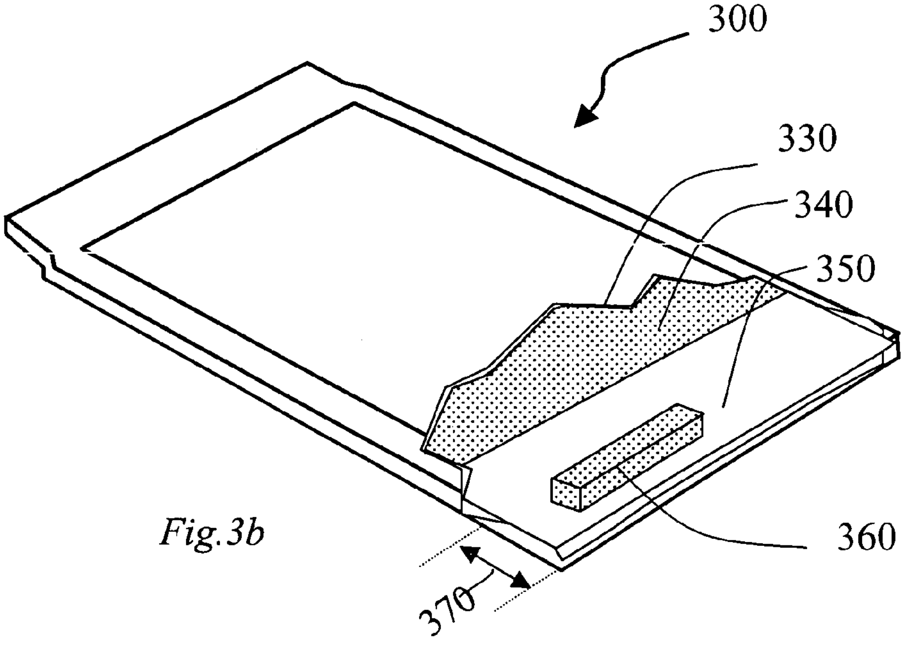

The forgoing aspects and many of the attendant advantages of this invention will become more readily appreciated by reference to the following detailed description, when taken in conjunction with the accompanying drawings, wherein:

FIG. 1 is a block diagram illustrating a wireless modem;

FIG. 2*a* is a perspective illustration of a PCMCIA wireless modem card;

FIG. 2*b* is a perspective illustration of the PCMCIA wireless modem card of FIG. 2*a* plugged into a PCMCIA slot of a laptop computer;

FIG. 3*a* is a perspective illustration of a wireless modem in the form of an extended PCMCIA PC card that includes an attached antenna within a plastic enclosure, the attached antenna being an unbalanced "F" type monopole;

FIG. 3*b* is a perspective cut-away illustration of the wireless modem of FIG. 3*a;*

Figure 4A:
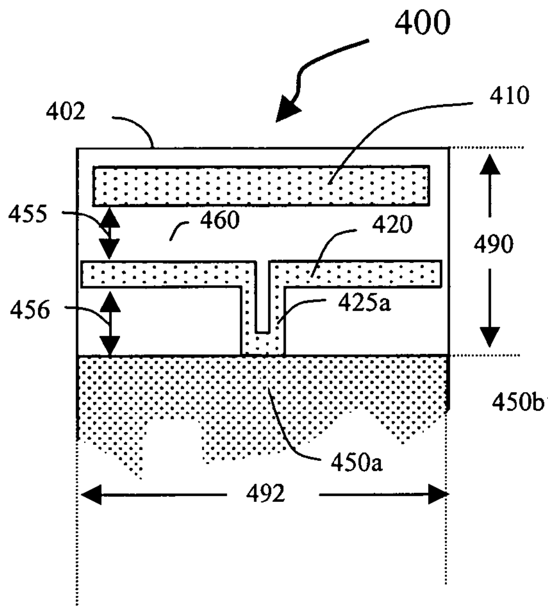
Figure 4B:
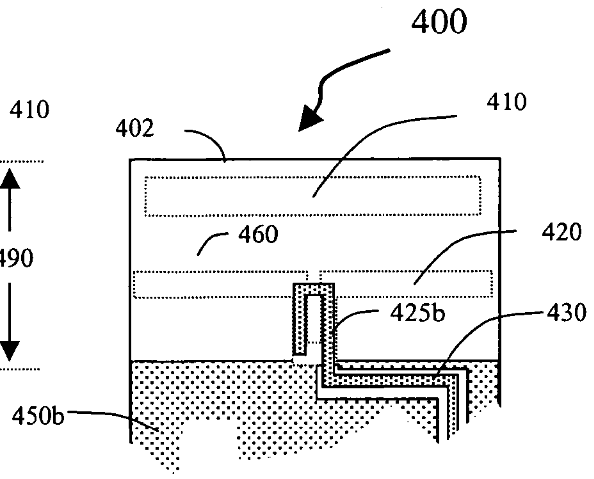

FIG. 4*a* is a partial schematic illustrating a portion of a first side of a wireless modem PWB card in accordance with one example embodiment of the present invention;

FIG. 4*b* is a partial schematic illustrating the opposite side of the wireless modem PWB card of FIG. 4*a;*

Figure 5A:
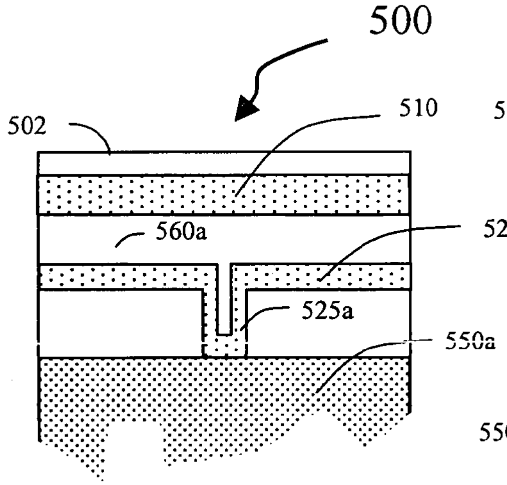
Figure 5B:
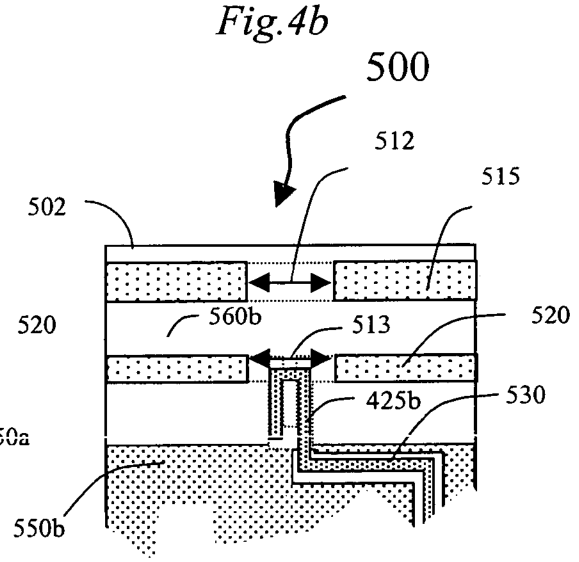

FIG. 5*a* is a partial schematic illustrating a portion of a first side of a wireless modem PWB card in accordance with a second example embodiment of the present invention;

FIG. 5*b* is a partial schematic illustrating the opposite side of the wireless modem PWB card of FIG. 5*a;*

Figure 6A:
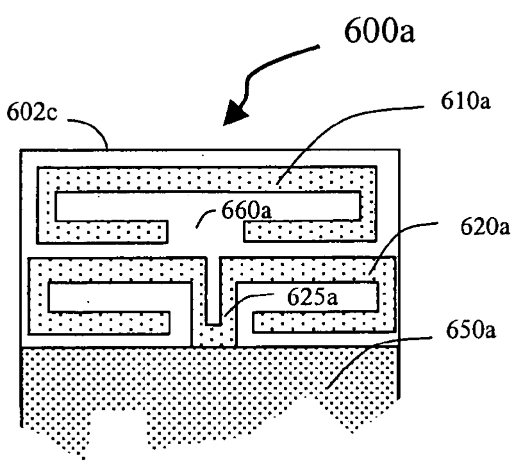
Figure 6B:
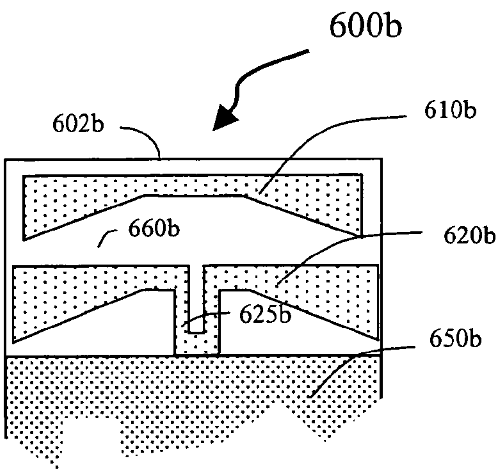
Figure 6C:
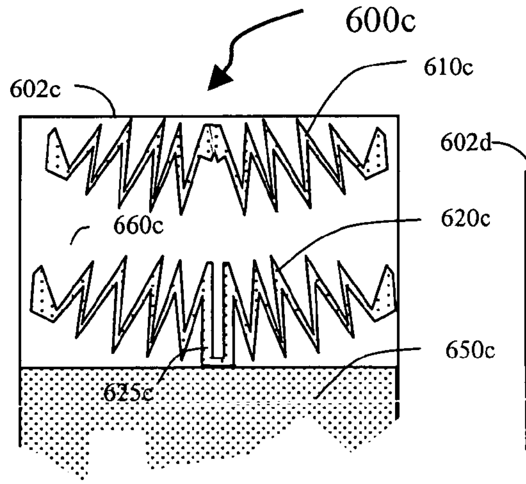
Figure 6D:
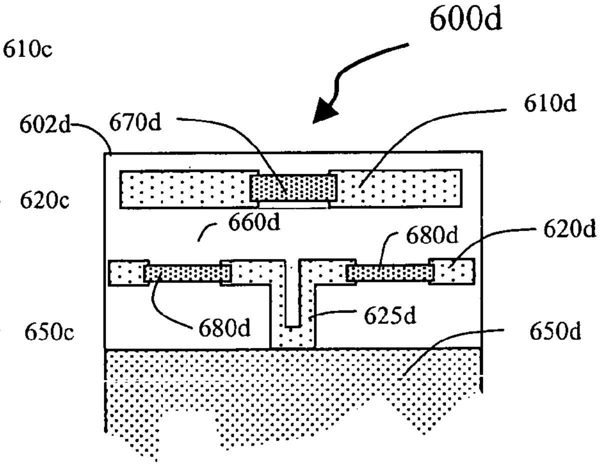
Figure 7A:
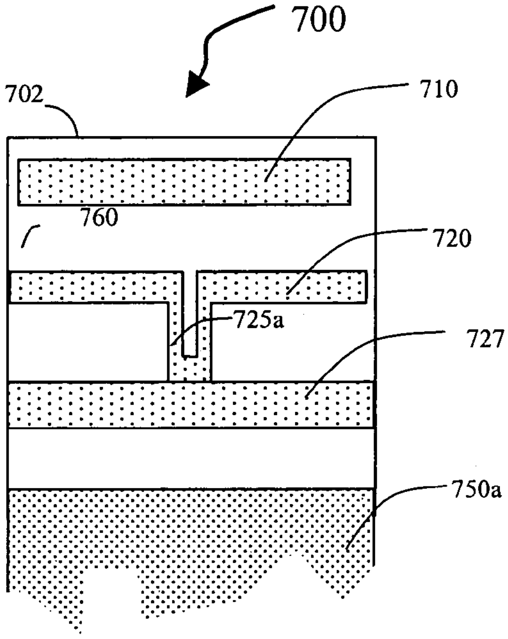
Figure 7B:
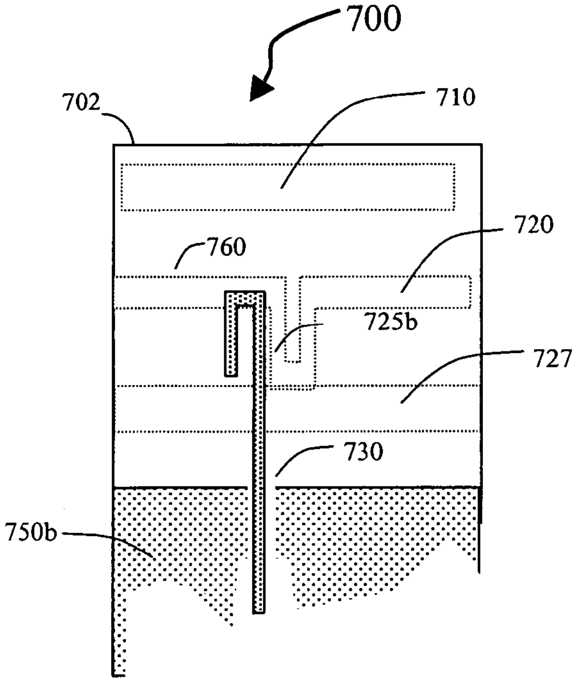

FIG. 6*a* is a partial schematic illustrating a portion of a first side of a wireless modem PWB card in accordance with a third example embodiment of the present invention;

FIG. 6*b* is a partial schematic illustrating a portion of a first side of a wireless modem PWB card in accordance with a fourth example embodiment of the present invention;

FIG. 6*c* is a partial schematic illustrating a portion of a first side of a wireless modem PWB card in accordance with a fifth example embodiment of the present invention;

FIG. 6*d* is a partial schematic illustrating a portion of a first side of a wireless modem PWB card in accordance with a sixth example embodiment of the present invention;

FIG. 7*a* is a partial schematic illustrating a portion of a first side of a wireless modem PWB card in accordance with a seventh example embodiment of the present invention;

FIG. 7*b* is a partial schematic illustrating the opposite side of the wireless modem PWB card of FIG. 7*a;*

Figure 8:
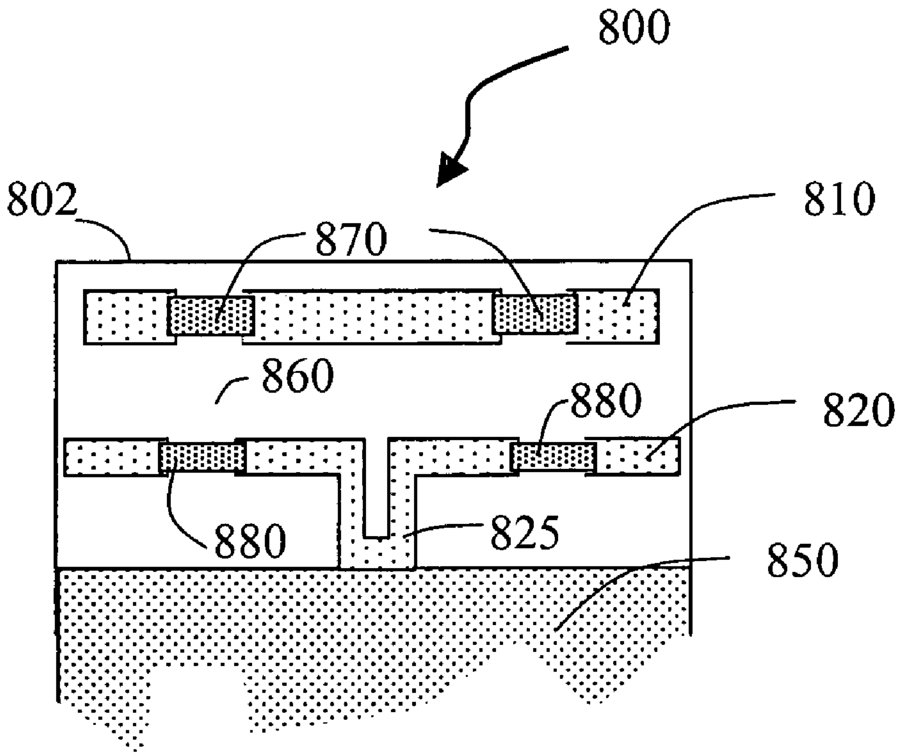

FIG. 8 is a partial schematic illustrating a portion of a first side of a wireless modem PWB card in accordance with a eighth example embodiment of the present invention;

FIG. 9*a* is a partial schematic illustrating a portion of a first side of a wireless modem PWB card in accordance with an ninth example embodiment of the present invention;

FIG. 9*b* is a partial schematic illustrating the opposite side of the wireless modem PWB card of FIG. 9*a;*

Figure 10A:
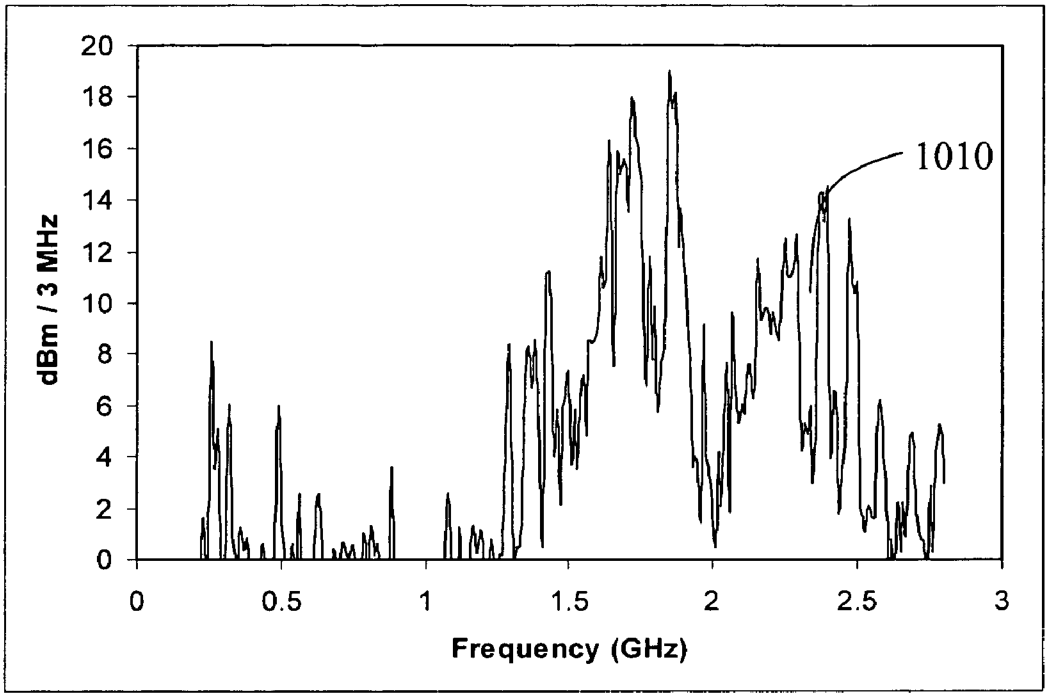

FIG. 10*a* is a plot of a measurement of the noise from a vertically polarized antenna minus the noise from an antenna of the present invention from 50 MHz to 2.8 GHz.

Figure 10B:
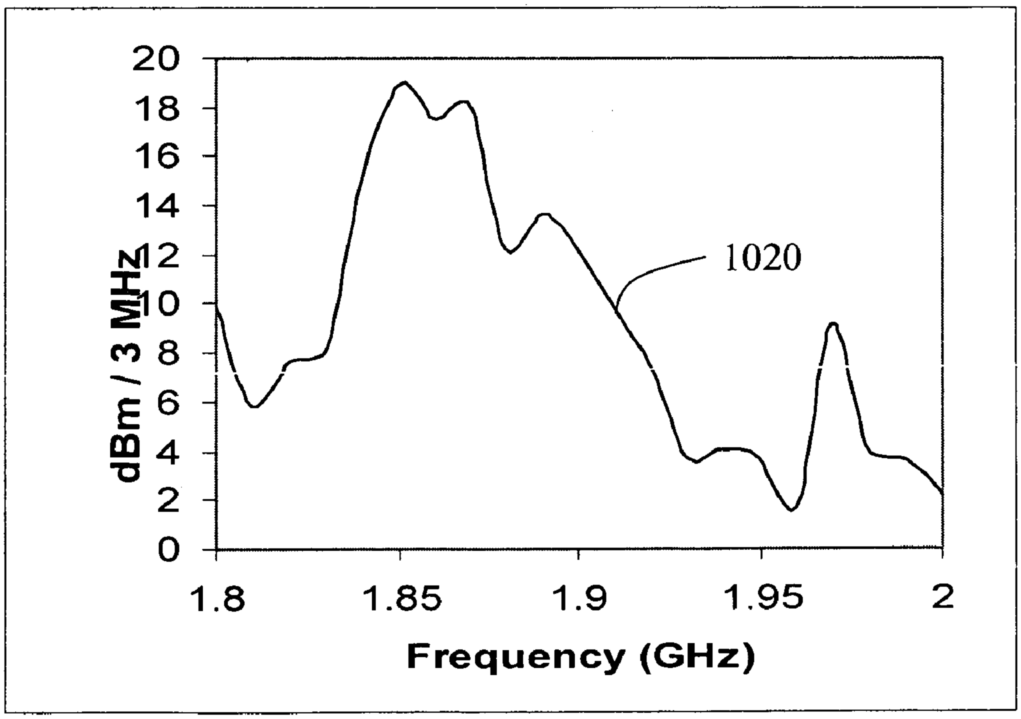

FIG. 10*b* is a plot of a measurement of the noise from a vertically polarized antenna minus the noise from an antenna of the present invention from 1.8 GHz to 2.0 GHz.

DETAILED DESCRIPTION OF THE PREFERRED EMBODIMENTS

1. Wireless Modems

FIG. 1 illustrates the basic components of a wireless modem 100. Wireless modem 100 includes a processor 102, a transceiver 104, balun and matching network 116 and an antenna 118. Processor 102 encodes and decodes baseband information signals. Encoded baseband information signal are coupled to transceiver 104, where they are converted to RF transmit signal. The RF transmit signals are coupled to antenna 118, via balun and matching network 116. This is the transmit path for modem 100. Conversely, RF energy received by antenna 118 is coupled, as a RF receive signal to transceiver 104 via balun and matching network 116. Transceiver 104, converts RF receive signals to baseband signals, which are coupled to processor 102, where they are decoded. This is the receive path for modem 100.

Processor 102 is often referred to as a baseband processor, because it encodes and decodes the baseband signals. Typically, a processor 102 will comprise a plurality of circuits/components. For example, a typical processor 102 can include Analog-to-Digital Converters (ADCs) for converting baseband signals received from transceiver 104 to digital information signals, and Digital-to-Analog Converters (DACs) for converting digital information signals to baseband signals that are sent to transceiver 104. A typical processor 102 can also include a decoder/encoder for encoding and decoding the digital information signals. The decoded digital information is typically sent to a processor core that can interpret the information and function accordingly. Such a processor core may be a microprocessor, microcontroller, or DSP. The processor core can also control the operation of transceiver 104. There are other circuits/components that can be included in processor 102. Moreover, any of the components may be implemented as standalone components separate from processor 102.

Transceiver 104 is typically split into a transmit and receive path. The transmit path comprises a modulator 108 that modulates baseband signals from processor 102 with an RF carrier 110 in order to generate an RF transmit signal. RF carrier 110 is a sinusoidal carrier signal with a frequency equal to that required by the communication channel used by modem 100 to communicate with the base station. The transmit path of transceiver 104 may also include a Power Amplifier (PA) 114. PAs are typically key components in any high frequency RF transmitter design. This is because RF transmitters typically require high output power to compensate for path losses and to achieve satisfactory signal levels at antenna 118.

The receive path of transceiver 104 comprises a demodulator 106 that modulates a received RF signal with RF carrier 110 in order to remove the carrier and extract the baseband information signal. The receive path may also include a Low Noise Amplifier (LNA). The RF signals received by antenna 118 are typically at very low signal levels. Therefore, a LNA is required in order to amplify the signal level, but not introduce noise that could swamp the low level received signal.

The receive and transmit paths are typically duplexed over a common connection 120 to antenna 118. The impedance of connection 120, however, needs to match the impedance of antenna 118 for antenna 118 to transmit the RF transmit signal efficiently. If the impedance is not matched, then RF energy will be reflected back in the opposite direction when a transmit or receive RF signal reaches connection 120. Therefore, the matching network portion of balun and matching network 116 can be included in order to match the impedance between connection 120 and antenna 118. Typically, for example, connection 120 will have impedance of 50 ohms. Therefore, the matching network needs to adjust the impedance of antenna 118 to be reasonably close to 50 ohms.

Connection 120 is often an unbalanced connection; however, antenna 118 typically requires a balanced signal. Therefore, the balun portion of balun and matching network 116 can be included in order to balance the RF transmit signal received from transceiver 104 through unbalanced connection 120. A balun is a wideband transformer capable of matching a balanced line, such as a twin lead, to an unbalanced line, such as a coaxial cable.

A common type of antenna 118 used for wireless communication is the half-wave dipole. A half-wave dipole is simply a straight conductor with a length that is electrically one half the transmission wavelength. Generally, a feed line is attached at the middle of the dipole at right angles to its length. Dipole antennas of electrical lengths shorter than one half the wavelength can also be used. For example, a quarter wave unbalanced vertical antenna is often used in smaller, portable devices.

As mentioned, there is a trend towards the integration of RF wireless modems into both portable and fixed types of electronic computing devices. For example, FIG. 2*a* is a perspective illustration of an extended PCMCIA wireless RF Modem 210 that is designed to be plugged into a PCMCIA slot connector 230 within host computer system 200. In FIG. 2*a*, the host computer system is a laptop 200. Modem 210 is shown with an external attached, vertically polarized, monopole antenna 220. FIG. 2*b* is a perspective illustration showing modem 210, with its antenna 220, fully inserted into PCMCIA slot 230 within laptop 200. It should be noted that the term “extended” means that a portion of the card still sticks out beyond the edge of the computer even when fully inserted as shown in FIG. 2*b*.

The externally attached antenna 220 of FIGS. 2*a* and 2*b* can be problematic. For example, it may interfere with a user's ability to use the keyboard of laptop 200, and it can be susceptible to damage due to its prone position. In contrast, FIGS. 3*a* and 3*b* illustrate a PCMCIA RF wireless modem 300 with integrated antenna 360. Antenna 360 is within a plastic enclosure 320 and is mounted within the extended portion 370 of modem 300. Antenna 360 may, for example, be an unbalanced “F” type monopole, as available from Rangestar of Aptos, Calif. In FIG. 3*b*, the plastic enclosure 320 and some of the external casing 330 of the PCMCIA card 300 has been cut away for viewing of the unbalanced “F” type monopole antenna 360 mounted on an internal Printed Wiring Board (PWB) 340. An area 350 around antenna 360 has been cleared of any metal conducting material.

Antenna 360 of RF wireless modem 300 is still vertically polarized, however, as per the industry standard. Therefore, antenna 360 and modem 300 are still susceptible to significant interference from a computing device, such as device 200, in which modem 300 is installed. In addition, antenna 360 may cause significant interference with a computing device in which it is installed.

2. Preferred Embodiments

To overcome these problems, the system and methods for a wireless modem assembly use an antenna design that is integrated into a PWB of a wireless modem assembly. This approach allows for a compact, low profile antenna design. Moreover, the systems and methods for a wireless modem assembly use a horizontally polarized antenna to reduce interference with and interference from the computing device in which the wireless modem is installed.

FIG. 4*a* is a partial schematic illustrating a portion of a first side of a wireless modem PWB card 402 with an integral antenna 400 in accordance with one embodiment of the systems and methods for a wireless modem assembly. Thus, antenna 400 is part of a wireless modem PWB card 402 that comprises a processor (not shown), such as processor 102, and a transceiver (not shown), such as transceiver 104. Antenna 400 comprises three elements, a director 410, a radiator 420, and a reflector 450. Radiator 420 is a dipole that is driven at approximately its midpoint by a balanced RF transmit signal. Typically, a dipole antenna radiates energy on all sides perpendicular to the long access. Therefore, radiator 420 will radiate RF energy both toward reflector 450 and toward director 410. The radiated energy going toward reflector 450, however, will be heading toward the computing device in which wireless modem PWB 402 has been installed. This is undesirable, because the radiated energy would likely cause interference with the computing device. Reflector 450 reflects at least some of this energy, however, thereby reducing any interference with the computing device.

Reflector 450 also serves another important function. The energy reflected by reflector 450 is redirected toward the front of radiator 420, i.e., toward director 410, forming a directional lobe. Therefore, antenna 400 is a directional antenna that transmits RF energy in a horizontal radiation pattern away from the wireless device in which the wireless modem PWB 402 is installed.

Depending on the spacing between radiator 420 and reflector 450, the use of reflector 450 can also result in a certain amount of directional gain for antenna 400. The spacing of each element of antenna 400 is discussed more fully below.

Director 410 also helps to direct radiated energy from radiator 420 away from the computing device in which the wireless modem PWB 402 is installed. By spacing (455) director 410 a distance that is sufficiently close to radiator 420, near-field coupling from radiator 420 can cause current to flow in director 410. The current can cause director 410 to radiate as well. The energy radiated by director 410 combines with the energy radiated by radiator 420 to form a directional lobe that is directed away from the computing device.

Radiator 420 is approximately an electrical half-wavelength at a design frequency $f_d$, with corresponding wavelength $\lambda_d$, although it could be physically shorter than a half-wavelength and still operate satisfactory with proper loading and impedance matching. Director 410 is preferentially electrically resonate at a higher frequency than $f_d$ and is typically 5 to 30 percent electrically shorter than radiator 420.

Reflector 450, works with director 410 and radiator 420 to bias the emitted radiation away from PWB 402. The spacing between the director 410 and radiator 420 is labeled 455 and is measured as the area of non-conducting material 460 between the elements. The spacing between radiator 420 and reflector 450 is labeled 456 and is measured as the area of non-conducting material 462 between the elements. Radiator 420 is closely spaced (456) relative to reflector 450 at a distance that is preferably between 0.01 times $\lambda_d$ and 0.1 times $\lambda_d$. Director 410 is also closely spaced (455) relative to radiator 420, towards the edge of PWB 402, at a distance that is preferably between 0.01 times $\lambda_d$ and 0.1 times $\lambda_d$. This close, compact, spacing allows for a directional radiation pattern without antenna 400 being too large for an integral design.

Preferably, the frequency limits for antenna 400 are from a minimum of 300 MHz to a maximum of 30 GHz.

Antenna 400 includes an integrated balun and matching network 425 for interfacing signals from a transceiver (not shown) to radiator 420. A top half of balun and matching network 425*a* for radiator 420 is shown as a “U” shaped feature in FIG. 4*a*. In this implementation, the bottom of the “U” is electrically connected to reflector 450. For all of the implementations described in this specification and that use a “U” shaped balun and matching network, the bottom of the “U” is electrically connected to the closest reflector. One may, however, practice the systems and methods for a wireless modem assembly without electrically coupling the bottom of the “U” shaped balun to the nearest reflector. For example, other balancing and matching schemes may be used, such as RF transformers, delta and gamma feeds, and discrete baluns to name a few.

The area occupied by antenna 400 is determined by width 492 and extension 490. The maximum area for antenna 400 occurs when width 492 is equal to or less than approximately 76.2 millimeters (mm) and extent 490 is equal to or less than approximately 35 mm; however, to have a reasonable efficiency, antenna 400 should have a width 492 that is at least approximately 10 mm and an extent 490 that is at least approximately 4 mm. Preferably, width 492 is approximately 50 mm and extent 490 is approximately 27 mm.

The above limits for the spacing of the elements, the antenna width and extent, the electrical antenna element size, and the antenna element construction techniques are common and apply to all of the implementations described in this specification.

FIG. 4*b* is a partial schematic illustrating a portion of the opposite side, of the modem PWB 402. The dashed lines indicate the position of director 410, radiator 420, and reflector 450 on the first side of PWB 402. A second part of balun and matching circuit 425*b* is shown, and is fed by feed line 430. Feed line 430 connects to a common RF transmit and RF receive connection (not shown), such as connection 120, on PWB 402.

All of the elements of antenna 400 are formed of conducting material directly on PWB 402 during the normal PWB bare-board manufacturing. The spaces between the elements, such as 460 and 462, are areas that are free from conducting material. Further, reflector 450 comprises a top and bottom portion 450*a* and 450*b*, respectively and, for antenna 400, reflector 450 is actually a ground plane that is included on PWB 402.

FIG. 5*a* is a partial schematic illustrating an alternative implementation of a wireless modem PWB 502 with an integral antenna 500. Antenna 500 comprises three elements, a director 510, a radiator 520, and a reflector 550. In the implementation of FIG. 5*a*, director 510 and radiator 520 extend around the edges of PWB 502. Director 510 and radiator 520 do not form a closed loop, however. Rather, FIG. 5*b* shows a first gap 512 that exists between the ends of the wrap around director 510 and a second gap 513 between the ends of radiator 520. Moreover, spacing between the edges of director 510 and radiator 520 and between radiator 520 and reflector 550 are limited by the same constraints as describe with respect to antenna 400.

Preferably, director 510 and radiator 520 wrap around the edge of PWB 502 and there are no internal conducting vias that join the two sides of elements 510 and 520.

Reflector 550 also comprises two sides 550*a* and 550*b* as does balun and matching network 525. The top side, 525*a*, of the balun and matching network is connected to reflector 550*a*, and the bottom side 525*b* is by feed line 530. Feed line 530 is connected to a common RF receive and RF transmit connection (not shown).

The dotted lines shown in FIG. 5*b* show the position of antenna 500 elements with respect to the second side of PWB 502. The insulating dialectric open areas on PWB 502 are indicated by the blank spaced on PWB 502, one of which is labeled on each side as 560*a* and 560*b*, respectively.

FIGS. 6*a*, 6*b*, 6*c*, and 6*d* illustrate alternative implementations of integral antennae 600*a*, 600*b*, 600*c*, and 600*d*, respectively, in accordance with the systems and methods for a wireless modem assembly. Each antenna 600*a*, 600*b*, 600*c*, and 600*d* allows for a lower operating frequency than that obtainable with antenna 400 of FIG. 4*a*. The spacing between antenna elements, however, are still constrained to the same limits as describe with respect to antenna 400. Only the first side of a PWB is shown for each antennae 600, the opposite sides being similar in construction to that shown in FIG. 4*b*.

FIG. 6*a* is a partial schematic illustrating a portion of one side of a wireless modem PWB 602*a* with an integral antenna 600*a*. Antenna 600*a* again comprises three elements, where two of the elements, a director 610*a* and a radiator 620*a*, are linearly loaded by folding back the conducting material comprising these elements in the manner illustrated in FIG. 6*a*. Reflector 650*a* operates as in the previously discussed implementations. Insulating space is labeled as 660*a* and a portion of a balun and matching network 625*a* is shown and is connected to reflector 650*a*.

In FIG. 6*b*, on the other hand, two of antenna 600*b* elements, a director 610*b* and a radiator 620*b*, are formed in a fan-shape to help lower and broaden the frequency response of antenna 600*b*. The dimensions of the fan shape will depend on the desired frequency response.

In FIG. 6*c*, a director 610*c* and radiator 620*c*, are linearly loaded by forming the conductive material that makes up each element into a zig-zag pattern as illustrated. There can be great variation in the exact zig-zag pattern depending on the requirements of specific implementations. The pattern illustrated in FIG. 6*c* is, therefore, by way of example only.

Finally, in FIG. 6*d*, inductors 670*d*, 680*d*, and 690*d* mounted on PWB 602*d* load a director 610*d* and radiator 620*d*. Loading by inductors allows efficient operation of antenna 600*d* at a frequency that is lower than the physical length of radiator 620*d* would otherwise allow.

FIG. 7*a* illustrates another alternative implementation of a wireless modem PWB 702 comprising an integral antenna 700. In this alternative implementation, antenna 700 comprises an additional reflector 727. Ground plane 750 of PWB 702 still acts as a reflector, however. In fact, the systems and methods for a wireless modem assembly can be implemented with as many reflectors as desired. Similarly, a plurality of directors can also be used. It should also be noted that the reflector or director can be omitted if required by a particular implementation.

FIG. 7*b* illustrates the opposite side of wireless modem PWB 702. The dotted lines indicate the positions on the first side of PWB702 of elements 710, 720, and 727, respectively.

FIG. 8 is a partial schematic illustrating a portion of one side of a wireless modem PWB 802 comprising an integral antenna 800 in still another alternative implementation of the systems and methods for a wireless modem assembly. Again, antenna 800 comprises three elements. Here, however, director 810 and radiator 820 contain two traps 870, and 880, respectively. Traps 870 and 880 make antenna 800 resonate on two different frequency bands and are formed of an equivalent parallel inductor and capacitor. The parallel inductor and capacitor are tuned to resonate at the high frequency band of antenna 800 and to offer high impedance to a higher frequency RF transmit signal. Effectively, traps 870 and 880 electrically disconnect the ends of director 810 and radiator 820 making them appear electrically shorter when radiator 820 is driven by a higher frequency RF transmit signal. Traps 870 and 880 also provide loading of the full length of antenna 800 so that it can still resonate at the lower frequency band as well. With this approach, a single antenna 800 can, for example, work at the AMPS frequency (low frequency band) and the PCS frequency (high frequency band).

FIGS. 9*a* and 9*b* illustrate a ninth and final alternative implementation of the systems and methods for a wireless modem assembly. FIG. 9*a* is a partial schematic illustrating a portion of a first side of a wireless modem PWB 902 comprising an integral antenna 900. Integral antenna 900 comprises three elements, a director 910, a radiator 920, and a reflector 927. Area 960 and the other blank areas in FIG. 9*a* indicate that those areas are free from conducting material. A balun and matching network 925*a* for radiator 920 is shown as a "U" shaped feature in the drawing. The bottom of the "U" is electrically connected to the reflector 927. The spacing between director 910 and radiator 920 is labeled 955 and is measured as the area of non-conducting material between the two elements. The spacing between radiator 920 and reflector 927 is labeled 956 and is measured as the area of non-conducting material between the two elements. All of the elements of the of antenna 900 are formed of conducting material directly on PWB 902 during the normal PWB bare-board manufacturing process.

Radiator 920 is approximately an electrical half-wavelength at a design frequency $f_d$, with corresponding wavelength $\lambda_d$, although it could be physically shorter than a half-wavelength and still operate satisfactory with proper loading and with impedance matching. Director 910 is preferably electrically resonate at a higher frequency than $f_d$ and is preferably 5 to 30 percent electrically shorter than radiator 920.

Reflector 927 works with director 910 and radiator 920 to bias the emitted radiation away from PWB 902. Reflector 927 is connected to the ground-plane 950*a* along its length, thus working similar to reflector 450. Radiator 910 is closely spaced (956) with respect to reflector 927, at a distance that is preferably between approximately 0.01 times $\lambda_d$ and approximately 0.1 times $\lambda_d$. Director 910*a* is also closely spaced 955 with respect to radiator 920, towards the edge of PWB 902, at a distance that is preferably between approximately 0.01 times $\lambda_d$ and approximately 0.1 times $\lambda_d$. This close, compact, spacing allows for a directional radiation pattern without antenna 900 being too large for an integral design.

The frequency limits for antenna 900 are preferably from a minimum of 300 MHz to a maximum of 30 GHz.

A width 992 and an extension 990 describe the overall size of antenna 900. At a maximum, the width 992 is equal to or less than approximately 76.2 mm and the extent 990 is equal to or less than approximately 35 mm; however, to have a reasonable efficiency, antenna 900 should have at least a width 992 of approximately 10 mm and an extent 990 of approximately 4 mm. Preferably, the width 992 is approximately 50 mm and the extent 990 is approximately 27 mm.

FIG. 9*b* shows the opposite side of PWB 902. As can be seen, director 910, radiator 920, and reflector 927 comprise conducting material on both the top and bottom of PWB 902. The top portion of each element is connected to the lower portion by multiple conducting vias (not shown) in PWB 902. Preferably, PWB 902 actually comprises a plurality of inner layers (not shown), where each inner layer comprises antenna elements that are replicas of the elements on the top layer, and where all of the layers are electrically connected through conducting vias.

A balun and matching circuit 925 is fed through a single pole double throw RF connector 973 that is mounted between a bottom portion of balun and matching network 925*b* and a feed line 930. Feed line 930 connects to a common RF transmit and RF receive connection (not shown) on PWB 902. RF connector 973 allows connecting test and measurement instrumentation to the wireless modem assembly and disconnects antenna 900 from the circuit when a male test connector (not shown) is inserted.

The radiation patterns from each antenna described is polarized in the plane of the respective PWBs and the radiation and or receive pattern is biased away from the circuitry on each of the respective PWBs. Each antenna reduces interference the receive circuitry of the respective wireless modem assemblies caused by the transmit portion of the respective modem assemblies in full duplex communications. Moreover, each antenna reduces the interference with the wireless modem assemblies caused by the operation of the respective computing device, such as a personal digital assistant (PDA) or OEM equipment, in which a wireless modem assembly is installed. In addition, each antenna reduces the interference to the respective computing device caused by the operation of the wireless modem assembly.

3. Test Results

FIG. 10*a* is a plot 1010 of a measurement of the noise from a presently used, vertically polarized antenna minus the noise from an antenna designed in accordance with this specification. The range of plot 1010 is from 50 MHz to 2.8 GHz. The difference is plotted in dBm/3 MHz. Vs frequency. The values plotted indicate that for a very wide range of frequencies, the vertically polarized antenna picks up a substantial amount more noise than a horizontal antenna designed in accordance with this specification.

FIG. 10*b* is a plot 1020 of a measurement of the noise from a presently used, vertically polarized antenna minus the noise from an antenna designed in accordance with this specification, where the range of plot 1020 is from 1.8 GHz to 2.0 GHz, i.e., including the PCS band. The difference is plotted in dBm/3 MHz. Vs frequency. The values plotted indicate that the vertically polarized antenna also picks up a substantial amount more noise for a range of frequencies covering the PCS band.

Picking up less noise is not necessarily enough to ensure adequate operation of the wireless modem assembly. In the following experiment, the noise, the signal, and the SNR are measured while receiving a PCS signal from a PCS base station.

Measurements were taken with 3 antennas V1, V2, and H1 to illustrate the improvements in Signal To Noise Ratio (SNR) obtained with a wireless modem assembly designed in accordance with this specification. Antenna V1, not shown but similar to antenna 220 in FIG. 2*a*, is a vertical quarter wave whip antenna, mounted on a first corner a PCMCIA card. A local PCS band base station was used to provide signal at around 1931 MHZ and a noise measurement was made adjacent the CDMA signal on a "quiet" frequency. The average signal strength, the average noise strength, and the SNR was measured for 8 angular rotations about a vertical axis centered on antenna of 0°, 45°, 90°, 135°, 180°, 225°, 270°, and 315° degrees with 0 degrees being magnetic north of the laptop on a desk. The test was repeated with antenna V2, not shown but also similar to 220 in FIG. 2*a*. Antenna V2 was mounted on the opposite side of a PCMCIA card relative to V1, with the card inserted into a PCMCIA slot on a PC laptop computer. Like V1, antenna V2 is a vertical quarter wave whip antenna. The test was repeated one more time. But this time with a prototype antenna H1, not shown but similar to antenna 900 shown in FIG. 9*a*.

Table 1 presents the signal measurements, the units are dBm/300 KHz. Table 2 presents the noise measurements, the units are dBm/300 KHz. Table 3 presents the SNR measurements, the units are dBm/300 KHz. Table 3 also includes the average of the SNR over the 8 angles.

TABLE 1

| Angle | V1-Signal dBm/300 Khz | V2-Signal dBm/300 Khz | H1-Signal dBm/300 Khz |
|---|---|---|---|
| 0 | −73.0 | −75.5 | −74.7 |
| 45 | −73.3 | −72.6 | −79.0 |
| 90 | −75.9 | −77.8 | −74.0 |
| 135 | −78.0 | −74.2 | −76.7 |
| 180 | −76.0 | −69.5 | −74.3 |
| 225 | −74.4 | −73.2 | −71.0 |
| 270 | −76.8 | −74.8 | −71.3 |
| 315 | −75.7 | −73.5 | −75.0 |

TABLE 2

| Angle | V1-Noise dBm/300 Khz | V2-Noise dBm/300 Khz | H1-Noise dBm/300 Khz |
|---|---|---|---|
| 0 | −79.5 | −79.2 | −82.2 |
| 45 | −79.5 | −80.6 | −83.0 |
| 90 | −79.6 | −81.7 | −84.0 |
| 135 | −80.1 | −81.5 | −81.0 |
| 180 | −80.3 | −78.8 | −85.4 |
| 225 | −80.4 | −80.0 | −82.6 |
| 270 | −79.9 | −79.5 | −82.0 |
| 315 | −79.8 | −80.1 | −81.7 |

TABLE 3

| Angle | V1-SNR dBm/300 Khz | V2-SNR dBm/300 Khz | H1-SNR dBm/300 Khz |
|---|---|---|---|
| 0 | 6.5 | 3.7 | 7.5 |
| 45 | 6.3 | 8.0 | 4.0 |
| 90 | 3.7 | 3.9 | 10.0 |
| 135 | 2.0 | 7.3 | 4.3 |
| 180 | 4.0 | 9.3 | 11.1 |
| 225 | 5.6 | 6.8 | 11.6 |
| 270 | 3.2 | 4.7 | 10.8 |
| 315 | 4.3 | 6.6 | 6.7 |
| AVERAGE => | 4.8 | 6.7 | 9.1 |

Note: averages calculated by converting the signal and noise values to linear scale, taking the ratio, averaging, and converting back to log scale.

As is seen in Table 3, the use of the H1 antenna improves the SNR ratio by a significant amount over antennae V1 and V2. While this measurement was taken in a receive mode, it is anticipated that a wireless modem assembly with an antenna such as H1 would also perform better when transmitting a signal to the base station.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The invention claimed is:

1. A wireless modem assembly, comprising:

a processor for encoding a baseband transmit signal and receiving a baseband receive signal;

a transceiver for modulating the baseband transmit signal with an RF carrier signal to produce an RF transmit signal and for demodulating an RF receive signal with an RF carrier signal to produce the baseband receive signal;

a horizontally polarized antenna for transmitting the RF transmit signal and for receiving the RF receive signal; and an unbalanced connection between the transceiver and the antenna, the connection configured to interface the RF transmit signal to the antenna and to interface the RF receive signal to the transceiver, and wherein the antenna comprises:

a matching network for matching an impedance of the unbalanced connection with an impedance of the antenna; and a balun for transforming the RF transmit signal received from the unbalanced connection into a balanced RF transmit signal.

2. The wireless modem assembly of claim 1, wherein the antenna further comprises a radiator for transmitting the balanced RF transmit signal.

3. The wireless modem assembly of claim 2, wherein the antenna further comprises a reflector for reflecting at least some of the energy of the transmitted signal.

4. The wireless modem assembly of claim 3, wherein the antenna further comprises a plurality of reflectors.

5. The wireless modem of claim 3, wherein the balun is electrically connected to the reflector.

6. The wireless modem assembly of claim 3, wherein the transceiver, and antenna are mounted on a printed wire board that comprises a ground plane, and wherein the ground plane comprises the reflector.

7. The wireless modem assembly of claim 3, wherein the radiator is substantially parallel with a near edge of the reflector, and wherein the spacing between the radiator and the near edge of the reflector is between approximately 0.01 times a design wavelength and approximately 0.1 times the design wavelength.

8. The wireless modem assembly of claim 3, wherein the antenna further comprises a director for directing the transmitted signal in a desired direction.

9. The wireless modem assembly of claim 8, wherein the antenna further comprises a plurality of directors.

10. The wireless modem assembly of claim 8, further comprising a printed wire board wherein at least some of the matching network, balun, radiator, and director are formed of conducting material directly on a top and/or bottom layers of the printed wire board.

11. The wireless modem assembly of claim 10, wherein the printed wire board comprises a plurality of inner layers, wherein each inner layer comprises replicas of the matching network, balun, radiator, or director formed on the top layer of the printed wiring board, and wherein each layer is electrically connected through vias included in the printed wiring board.

12. The wireless modem assembly of claim 8, wherein the director is substantially parallel with the radiator, and wherein the spacing between the radiator and the director is between approximately 0.01 times a design wavelength and approximately 0.1 times the design wavelength.

13. The wireless modem assembly of claim 8, wherein the maximum area of the antenna is approximately 76.2 mm by 35 mm, and wherein the minimum area of the antenna is approximately 10 mm by 4 mm.

14. The wireless modem assembly of claim 8, wherein the area of the antenna is approximately 50 mm by 27 mm.

15. The wireless modem assembly of claim 8, wherein the antenna further comprises a first and second loading inductor, the loading inductors configured to allow the antenna to operate efficiently at a lower frequency than the physical length of the antenna would otherwise allow.

16. The wireless modem assembly of claim 8, wherein the antenna further comprises a first and second trap, the traps configured so that the antenna transmits at two different design frequencies.

17. The wireless modem assembly of claim 16, wherein the first and second traps comprise an inductor and a capacitor in parallel with the inductor.

18. The wireless modem assembly of claim 8, wherein the electrical length of the radiator is approximately half of a design wavelength.

19. The wireless modem assembly of claim 8, wherein the electrical length of the radiator is less than half of a design wavelength.

20. The wireless modem assembly of claim 8, wherein the electrical length of the director is approximately 5 to approximately 30 percent shorter than the electrical length of the radiator.

21. The wireless modem assembly of claim 8, wherein the wireless modem assembly is installed in a computing device, and wherein the reflector reflects some of the energy of the transmitted signal away from the computing device, and wherein the director directs the transmitted signal outward from the computing device.

22. A wireless modem assembly, comprising:

an encoding means for encoding a baseband transmit signal and receiving a baseband receive signal;

a modulation means for modulating the baseband transmit signal with a RF carrier signal to produce a RF transmits signal and for demodulating a RF receive signal with a RF carrier signal to produce the baseband receive signal;

a horizontally polarized transmission means for transmitting the RF transmit signal and for receiving the RF receive signal;

a connection means for connecting the modulation means and the transmission means, and wherein the transmission means comprises:

a matching means for matching an impedance of the connection means with an impedance of the transmission means;

a balancing means for transforming the RF transmit signal into a balanced RF transmit signal;

a radiator means for transmitting the balanced RF transmit signal;

a reflector means for reflecting some of the energy of the transmitted signal; and a director means for directing the transmitted signal in a desired direction.

23. The wireless modem assembly of claim 22, wherein the maximum area of the transmission means is approximately 76.2 mm by 35 mm, and wherein the minimum area of the transmission means is approximately 10 mm by 4 mm.

24. The wireless modem assembly of claim 22, wherein the area of the transmission means is approximately 50 mm by 27 mm.

25. A horizontally polarized antenna, comprising:

a matching network for matching an impedance of the antenna with an impedance of an unbalanced connection;

a balun for transforming a RF transmit signal received from the unbalanced connection into a balanced RF transmit signal;

a radiator for transmitting the balanced RF transmit signal; and a reflector for reflecting at least some of the energy of the transmitted signal, the maximum area of the antenna being approximately 76.2 mm by 35 mm, and the minimum area of the antenna being approximately 10 mm by 4 mm.

26. The horizontally polarized antenna of claim 25, wherein the area of the antenna is approximately 50 mm by 27 mm.

27. The horizontally polarized antenna of claim 25 is included in a wireless modem assembly.

28. A horizontally polarized antenna, comprising:

a matching network for matching an impedance of the antenna with an impedance of an unbalanced connection;

a balun for transforming a RF transmit signal received from the unbalanced connection into a balanced RF transmit signal;

a radiator for transmitting the balanced RF transmit signal;

a reflector for reflecting at least some of the energy of the transmitted signal; and a director for directing the transmitted signal in a desired direction, the maximum area of the antenna being approximately 76.2 mm by 35 mm, and the minimum area of the antenna being approximately 10 mm by 4 mm.

29. The horizontally polarized antenna of claim 28, wherein the area of the antenna is approximately 50 mm by 27 mm.

30. The horizontally polarized antenna of claim 28 is included in a wireless modem assembly.

* * * * *